(12) United States Patent
Weyland et al.

(10) Patent No.: US 12,421,379 B2
(45) Date of Patent: Sep. 23, 2025

(54) POLYETHYLENE PIPE

(71) Applicant: BASF SE, Ludwigshafen am Rhein (DE)

(72) Inventors: Tania Weyland, Kaisten (CH); Marie Laure Bertet, Levallois-Perret (FR); Heinz Herbst, Kaisten (CH)

(73) Assignee: BASF SE, Ludwigshafen am Rhein (DE)

( * ) Notice: Subject to any disclaimer, the term of this patent is extended or adjusted under 35 U.S.C. 154(b) by 566 days.

(21) Appl. No.: 16/627,499

(22) PCT Filed: Jul. 3, 2018

(86) PCT No.: PCT/EP2018/067893
§ 371 (c)(1),
(2) Date: Dec. 30, 2019

(87) PCT Pub. No.: WO2019/007935
PCT Pub. Date: Jan. 10, 2019

(65) Prior Publication Data
US 2020/0157324 A1 May 21, 2020

(30) Foreign Application Priority Data
Jul. 6, 2017 (EP) .................................. 17180079

(51) Int. Cl.
| C08L 23/12 | (2006.01) |
| C07F 9/655 | (2006.01) |
| C08F 10/02 | (2006.01) |
| C08F 10/06 | (2006.01) |
| C08J 3/20 | (2006.01) |
| C08K 3/22 | (2006.01) |
| C08K 3/26 | (2006.01) |
| C08K 5/00 | (2006.01) |
| C08K 5/05 | (2006.01) |
| C08K 5/06 | (2006.01) |
| C08K 5/098 | (2006.01) |
| C08K 5/103 | (2006.01) |

(Continued)

(52) U.S. Cl.
CPC .......... *C08L 23/12* (2013.01); *C07F 9/65517* (2013.01); *C08F 10/02* (2013.01); *C08F 10/06* (2013.01); *C08J 3/201* (2013.01); *C08K 3/22* (2013.01); *C08K 3/26* (2013.01); *C08K 5/0041* (2013.01); *C08K 5/005* (2013.01); *C08K 5/05* (2013.01); *C08K 5/06* (2013.01); *C08K 5/098* (2013.01); *C08K 5/103* (2013.01); *C08K 5/105* (2013.01); *C08K 5/13* (2013.01); *C08K 5/1345* (2013.01); *C08K 5/1535* (2013.01); *C08K 5/1545* (2013.01); *C08K 5/17* (2013.01); *C08K 5/24* (2013.01); *C08K 5/29* (2013.01); *C08K 5/3435* (2013.01); *C08K 5/3492* (2013.01); *C08K 5/521* (2013.01); *C08K 5/523* (2013.01); *C08K 5/526* (2013.01); *C08K 5/527* (2013.01); *C08K 5/529* (2013.01); *C08L 23/06* (2013.01); *C07F 9/091* (2013.01); *C07F 9/098* (2013.01); *C07F 9/6552* (2013.01); *C08K 2003/2224* (2013.01); *C08K 2003/2227* (2013.01); *C08K 2003/2296* (2013.01); *C08K 2003/267* (2013.01); *C08K 2201/014* (2013.01); *C08L 2201/08* (2013.01); *C08L 2203/18* (2013.01); *C08L 2207/062* (2013.01); *C08L 2207/066* (2013.01); *C08L 2207/20* (2013.01)

(58) Field of Classification Search
CPC ........ F16L 11/04; F16L 11/042; F16L 11/045; F16L 11/06; F16L 11/08; F16L 11/081; F16L 11/082; F16L 11/083; F16L 11/085; F16L 11/086; F16L 11/088; F16L 11/10; F16L 11/11; F16L 11/14; F16L 9/127; B32B 1/08; B29L 2023/22; B29C 48/022; B29C 48/09; C08K 3/00; C08K 3/013; C08K 3/014; C08L 23/04; C08L 23/06; C08L 23/08; C08L 23/0807; C08L 23/0815; C08L 23/0823; C08L 23/083; C08L 23/0838; C08L 23/0846; C08L 23/0853; C08L 23/00861; C08L 23/0869; C08L 23/0876; C08L 23/088; C08L 23/0892; B29K 2023/06; Y10T 428/139; Y10T 428/1393
USPC .................................. 428/36.9, 36.91, 36.92
See application file for complete search history.

(56) References Cited

U.S. PATENT DOCUMENTS

| 4,325,863 A | 4/1982 | Hinsken et al. |
| 4,338,244 A | 7/1982 | Hinsken et al. |

(Continued)

FOREIGN PATENT DOCUMENTS

| CA | 2180073 | 12/1996 |
| CA | 3121690 | 6/2020 |

(Continued)

OTHER PUBLICATIONS

Additivesforpolymers website accessed online at https://www.additivesforpolymer.com/portfolio/hals-944/ accessed Apr. 21, 2022 (Year: 2022).*
Technical Information sheet for Chimassorb 2020 published online at http://www.mohe021.com/uploads/soft/180202/2020.pdf on Nov. 15, 2010 (Year: 2010).*
DHT-4A Acid Scavenger For Polymers published online by Kisuma Chemicals and archived online on Mar. 10, 2017 at ttps://web.archive.org/web/20170310113423/https://www.kisuma.com/images/Brochures/KCBV_DHT-4A_brochure_website.pdf (Year: 2017).*

(Continued)

*Primary Examiner* — James C Yager
(74) *Attorney, Agent, or Firm* — Grüneberg and Myers PLLC

(57) ABSTRACT

A polyethylene pipe comprising components A) and B), wherein component A) is a hindered amine light stabilizer containing a triazine residue, component B) is a natural or synthetic hydrotalcite and the weight ratio of component A) to component B) is 1:10 to 10:1.

7 Claims, No Drawings

(51) Int. Cl.
*C08K 5/105* (2006.01)
*C08K 5/13* (2006.01)
*C08K 5/134* (2006.01)
*C08K 5/1535* (2006.01)
*C08K 5/1545* (2006.01)
*C08K 5/17* (2006.01)
*C08K 5/24* (2006.01)
*C08K 5/29* (2006.01)
*C08K 5/3435* (2006.01)
*C08K 5/3492* (2006.01)
*C08K 5/521* (2006.01)
*C08K 5/523* (2006.01)
*C08K 5/526* (2006.01)
*C08K 5/527* (2006.01)
*C08K 5/529* (2006.01)
*C08L 23/06* (2006.01)
*C07F 9/09* (2006.01)

(56) References Cited

U.S. PATENT DOCUMENTS

| | | | | |
|---|---|---|---|---|
| 4,746,692 | A * | 5/1988 | Hayden | C08K 5/34 524/100 |
| 5,175,312 | A | 12/1992 | Dubs et al. | |
| 5,216,052 | A | 6/1993 | Nesvadba et al. | |
| 5,252,643 | A | 10/1993 | Nesvadba | |
| 6,046,304 | A | 4/2000 | Borzatta et al. | |
| 2003/0073768 | A1 | 4/2003 | Koch et al. | |
| 2005/0148700 | A1 | 7/2005 | Kramer et al. | |
| 2006/0275571 | A1 * | 12/2006 | Mure | C08L 23/04 428/36.9 |
| 2007/0197697 | A1 | 8/2007 | Botkin et al. | |
| 2007/0254990 | A1 * | 11/2007 | Lewoniuk | C08K 5/34 524/323 |
| 2010/0081741 | A1 * | 4/2010 | Keck-Antoine | C08K 5/005 524/110 |
| 2014/0364545 | A1 | 12/2014 | Prachoomdang et al. | |
| 2015/0211673 | A1 * | 7/2015 | Jan | C08F 210/16 428/36.9 |
| 2017/0066905 | A1 | 3/2017 | Hoelzl et al. | |

FOREIGN PATENT DOCUMENTS

| | | | |
|---|---|---|---|
| CA | 3122176 | 6/2020 | |
| DE | 43 16 611 A1 | 11/1993 | |
| DE | 43 16 622 A1 | 11/1993 | |
| DE | 43 16 876 A1 | 11/1993 | |
| EP | 0 589 839 A1 | 3/1994 | |
| EP | 0 591 102 A1 | 4/1994 | |
| EP | 1 291 384 A1 | 3/2003 | |
| JP | H09324081 | 12/1997 | |
| JP | 2003524050 | 8/2003 | |
| WO | WO-2011101091 A1 * | 8/2011 | C08L 23/10 |
| WO | WO 2015/121445 A1 | 8/2015 | |
| WO | WO-2017/025431 A1 | 2/2017 | |
| WO | WO-2017133918 A1 * | 8/2017 | C08K 3/30 |

OTHER PUBLICATIONS

Wypych et al., Databook of UV Stabilizers, Chemtec Publishing, Toronto, 2015, pp. 239-240 (Year: 2015).*
Wright, David, Failure of Plastics and Rubber Product, Rapra technology, Shawbury, p. 37 (Year: 2001).*
European Search Report issued on Dec. 7, 2017 in corresponding European Patent Application No. 17180079.0, 3 pages.
International Preliminary Report on Patentability and Written Opinion issued Jan. 7, 2020 in PCT/EP2018/067893 (English Translation only), 6 pages.
International Search Report issued Oct. 10, 2018 in PCT/EP2018/067893 filed Jul. 3, 2018.
Brazilian Office Action dated May 2, 2022, in Brazilian Application No. 112019027881-8, 4 pages.

* cited by examiner

POLYETHYLENE PIPE

The present invention relates to a polyethylene pipe comprising components A) and B), wherein component A) is a hindered amine light stabilizer containing a triazine residue, component B) is a natural or synthetic hydrotalcite and the weight ratio of component A) to component B) is 1:10 to 10:1, preferably 1:5 to 5:1.

In more detail, the pipe according to the present invention preferably consists of a polyethylene composition comprising the components A) and B) in a weight ratio of 1:10 to 10:1.

Component A) is in particular at least one compound of the formula (A-I), (A-II) or (A-III)

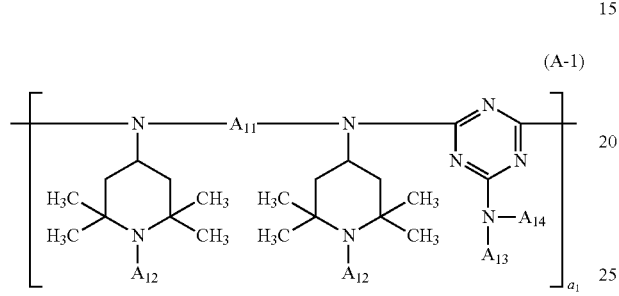
(A-I)

wherein $A_{11}$ is $C_2$-$C_{18}$alkylene, $C_5$-$C_7$cycloalkylene or $C_1$-$C_4$alkylenedi($C_5$-$C_7$cycloalkylene), the radicals $A_{12}$ independently of one another are hydrogen, $C_1$-$C_{12}$alkyl or $C_5$-$C_{12}$cycloalkyl, $A_{13}$ and $A_{14}$ independently of one another are hydrogen, $C_1$-$C_{12}$alkyl, $C_5$-$C_{12}$cycloalkyl or a group of the formula (a-1),

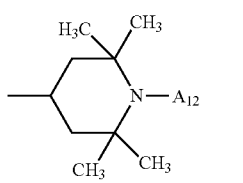
(a-1)

or the radicals $A_{13}$ and $A_{14}$, together with the nitrogen atom to which they are bonded, form a 5- to 10-membered heterocyclic ring and $a_1$ is a number from 1 to 20, preferably 2 to 20, and the repeating units are identical or different;

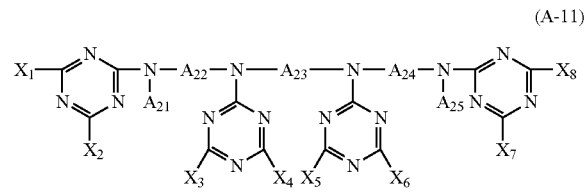
(A-11)

wherein $A_{21}$ and $A_{25}$ independently of one another are hydrogen, $C_1$-$C_{12}$alkyl, $C_5$-$C_{12}$cycloalkyl or a group of the formula (a-1), $A_{22}$, $A_{23}$ and $A_{24}$ independently of one another are $C_2$-$C_{10}$alkylene, and $X_1$, $X_2$, $X_3$, $X_4$, $X_5$, $X_6$, $X_7$ and $X_8$ independently of one another are a group of the formula (a-2),

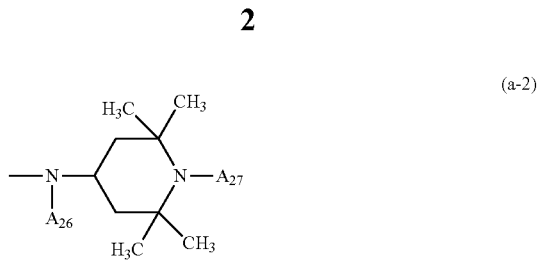
(a-2)

in which $A_{26}$ is hydrogen, $C_1$-$C_{12}$alkyl, $C_5$-$C_{12}$cycloalkyl or a group of the formula (a-1) as defined above, and $A_{27}$ has one of the meanings of $A_{12}$;

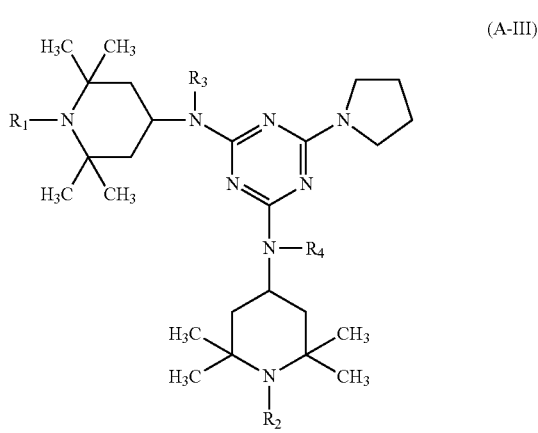
(A-III)

wherein $R_1$ and $R_2$ independently of one another are hydrogen, $C_1$-$C_{22}$alkyl, —O—, —OH, —CH$_2$CN, $C_1$-$C_{18}$alkoxy, $C_2$-$C_{18}$alkoxy substituted by —OH; $C_5$-$C_{12}$cycloalkoxy, $C_3$-$C_6$alkenyl, $C_3$-$C_6$alkenyloxy, $C_7$-$C_9$phenylalkyl unsubstituted or substituted on the phenyl by 1, 2 or 3 $C_1$-$C_4$alkyl; or $C_1$-$C_8$acyl; and $R_3$ and $R_4$ independently of one another are $C_1$-$C_{22}$alkyl or a group of the formula (a-3)

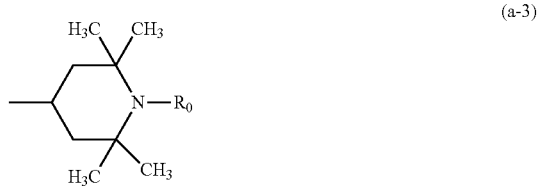
(a-3)

wherein $R_0$ has one of the meanings of $R_1$ and $R_2$.

Component B) is preferably a mixed hydroxide of the formula (B-I) or (B-II).

(B-I)

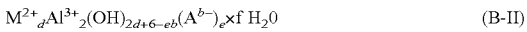
(B-II)

$M^{2+}$ is for example $Ca^{2+}$, $Mg^{2+}$, $Sr^{2+}$, $Ba^{2+}$, $Zn^{2+}$, $Pb^{2+}$, $Sn^{2+}$ or $Ni^{2+}$.

$M^{3+}$ is for example $Al^{3+}$, $B^{3+}$ or $Bi^{3+}$.

a is for example a number up to 0.5.

$A^{b-}$ is an anion of valency b, for example $Cl^-$, $Br^-$, $NO^{3-}$, $CO_3^{2-}$, $SO_4^{2-}$ or $SeO_4^{3-}$.

b is for example an integer from 1 to 4.

c is for example zero or a number up to 2.

d is for example a number up to 6.

e is for example a number up to 2.

f is for example zero or a number up to 15.

Hydrotalcites which are of interest are layered double hydroxides that contain positively charged hydroxide layers and charge balancing anions located in the interlayer region.

Component B) is in particular at least one magnesium aluminum hydroxide carbonate hydrate which is for example commercially available as Hycite®713, ®DHT-4A, ®DHT-4V, ®DHT-4A-2, ®DHT-4C or Sorbacid®911, or zinc aluminum hydroxide carbonate hydrate which is for example commercially available as ®ZHT-4V or Sorbacid®944, or mixtures thereof.

Of particular interest is a magnesium aluminum hydroxide carbonate hydrate which is for example commercially available as Hycite®713 or DHT-4A.

Examples of alkyl having up to 22 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetra-methylpentyl, nonyl, decyl, undecyl, 1-methylundecyl, dodecyl, 1,1,3,3,5,5-hexamethyl-hexyl, tridecyl, tetradecyl, pentadecyl, hexadecyl, heptadecyl, octadecyl and eicosyl. $C_1$-$C_{18}$alkoxy is for example methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy or octadecyloxy.

$C_2$-$C_{18}$alkoxy substituted by —OH is for example 2-hydroxyethoxy.

$C_5$-$C_{12}$cycloalkyl is for example cyclopentyl, cyclohexyl, cycloheptyl, cyclooctyl, cyclodecyl or cyclododecyl. $C_5$-$C_8$Cycloalkyl, in particular cyclohexyl, is preferred. $C_5$-$C_{12}$cycloalkoxy is for example cyclopentoxy, cyclohexoxy, cycloheptoxy, cyclooctoxy, cyclodecyloxy or cyclododecyloxy. $C_5$-$C_8$Cycloalkoxy, in particular cyclopentoxy and cyclohexoxy, is preferred.

$C_3$-$C_6$alkenyl is for example allyl, 2-methallyl, butenyl, pentenyl or hexenyl. Allyl is preferred. The carbon atom in position 1 is preferably saturated.

$C_3$-$C_6$alkenyloxy is for example propenyloxy.

$C_7$-$C_9$phenylalkyl unsubstituted or substituted on the phenyl by 1, 2 or 3 $C_1$-$C_4$alkyl is for example benzyl, 2-phenylethyl, dimethylbenzyl, trimethylbenzyl or tert-butylbenzyl.

Examples of $C_1$-$C_8$acyl are formyl, acetyl, propionyl, butyryl, pentanoyl, hexanoyl, heptanoyl, octanoyl, acryloyl, methacryloyl and benzoyl. $C_1$-$C_8$Alkanoyl, $C_3$-$C_8$alkenoyl and benzoyl are preferred. Acetyl and acryloyl are especially preferred.

Examples of alkylene having up to 18 carbon atoms are ethylene, propylene, trimethylene, tetramethylene, pentamethylene, 2,2-dimethyltrimethylene, hexamethylene, trimethylhexamethylene and octamethylene. $C_2$-$C_6$alkylene, in particular hexamethylene is preferred.

An example of $C_5$-$C_7$cycloalkylene is cyclohexylene.

An example of $C_1$-$C_4$alkylenedi($C_5$-$C_7$cycloalkylene) is methylenedicyclohexylene.

A preferred example of a 5- to 7-membered heterocyclic ring is a morpholine group.

The meanings of the terminal groups which saturate the free valences in the compounds of the formula (A-I) depend on the processes used for their preparation. The terminal groups can also be modified after the preparation of the compounds.

If the compounds of the formula (A-I) are prepared by reacting a compound of the formula

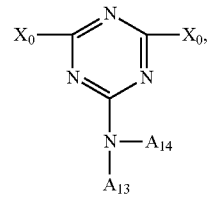

in which $X_0$ is, for example, halogen, in particular chlorine, and $A_{13}$ and $A_{14}$ are as defined above, with a compound of the formula

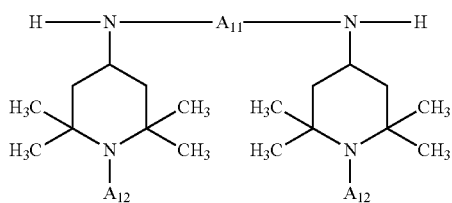

in which $A_{11}$ and $A_{12}$ are as defined above, the terminal group bonded to the diamino radical is for example hydrogen or

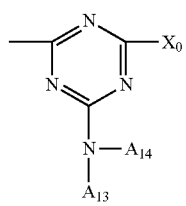

and the terminal group bonded to the triazine radical is for example $X_0$ or

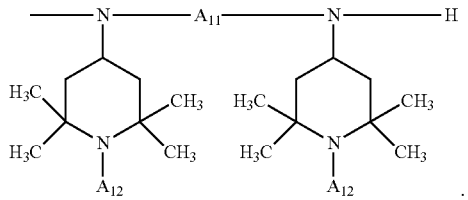

If $X_0$ is halogen, it is advantageous to replace this, for example, by —OH or an amino group when the reaction is complete. Examples of amino groups which may be mentioned are pyrrolidin-1-yl, morpholino, —$NH_2$, —$N(C_1$-$C_8$alkyl)$_2$ and —$NR_0(C_1$-$C_8$alkyl), in which $R_0$ is hydrogen or a group of the formula (Ia).

One of the preferred compounds of the formula (I) is

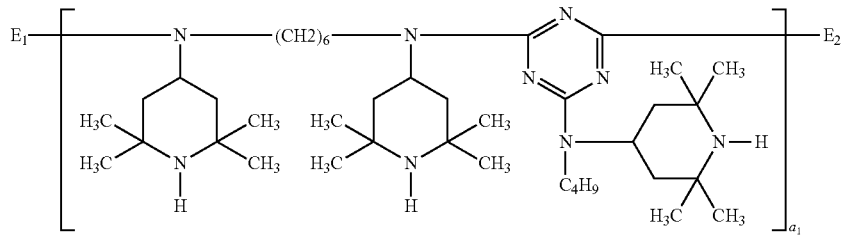

wherein $E_1$ is

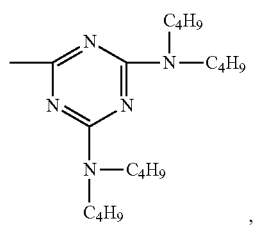

$E_2$ is

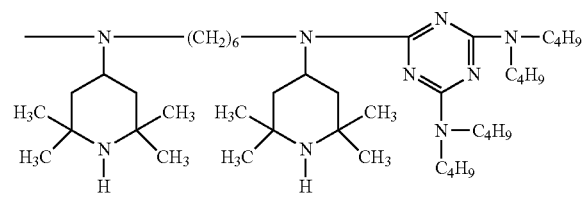

and $a_1$ is a number from 1 to 10, preferably 2 to 10. The preparation of this compound is described in Example 10 of U.S. Pat. No. 6,046,304.

According to a preferred embodiment $A_{11}$ is $C_2$-$C_{10}$alkylene, the radicals $A_{12}$ independently of one another are hydrogen, $C_1$-$C_4$alkyl or cyclohexyl, $A_{13}$ and $A_{14}$ independently of one another are hydrogen, $C_1$-$C_4$alkyl, cyclohexyl or a group of the formula (a-1),

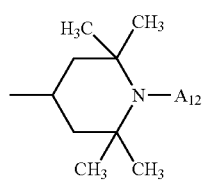
(a-1)

or the radicals $A_{13}$ and $A_{14}$, together with the nitrogen atom to which they are bonded, form a morpholino group and $a_1$ is a number from 1 to 10, preferably 2 to 10, and the repeating units are identical or different;

$A_{21}$ and $A_{25}$ independently of one another are hydrogen, $C_1$-$C_4$alkyl or cyclohexyl, $A_{22}$, $A_{23}$ and $A_{24}$ independently of one another are $C_2$-$C_{10}$alkylene, and $X_1$, $X_2$, $X_3$, $X_4$, $X_5$, $X_6$, $X_7$ and $X_8$ independently of one another are a group of the formula (a-2),

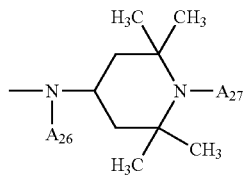
(a-2)

in which $A_{26}$ is hydrogen, $C_1$-$C_4$alkyl, cyclohexyl or a group of the formula (a-1) as defined above, and $A_{27}$ has one of the meanings of $A_{12}$;

$R_1$ and $R_2$ independently of one another are hydrogen, $C_1$-$C_4$alkyl or cyclohexyl; and $R_3$ and $R_4$ independently of one another are $C_1$-$C_4$alkyl or a group of the formula (a-3)

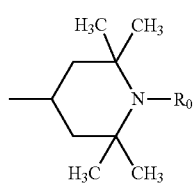
(a-3)

wherein $R_0$ has one of the meanings of $R_1$ and $R_2$.

According to a further preferred embodiment component A) is a compound of the formula (A-I-1), (A-I-2), (A-II-1) or (A-III-1),
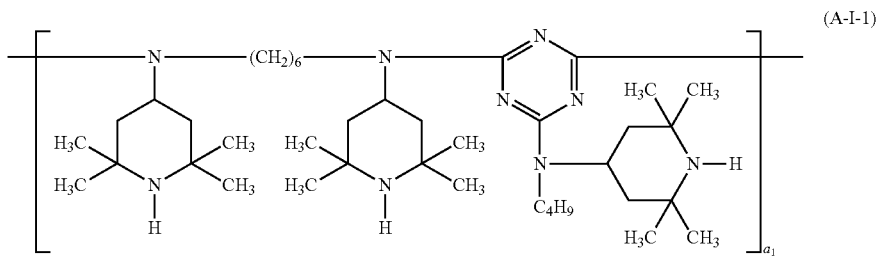
(A-I-1)
with $a_1$ being 2 to 10,
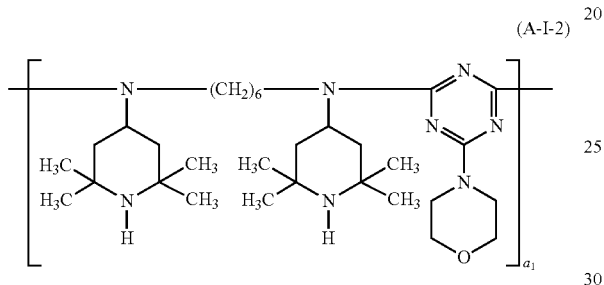
(A-I-2)
with $a_1$ being 2 to 10,
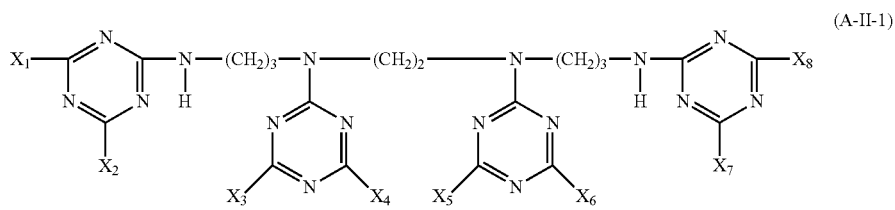
(A-II-1)
wherein $X_1$, $X_2$, $X_3$, $X_4$, $X_5$, $X_6$, $X_7$ and $X_8$ are the group
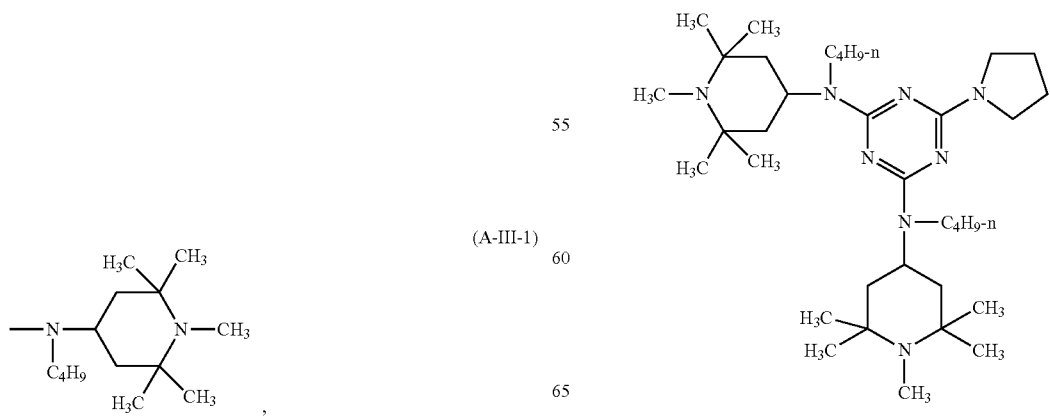
(A-III-1)
-continued The polyethylene pipe may additionally comprise a component C) which is a phenolic antioxidant, in particular 1,3,5-tris(3,5-di-tert-butyl-4-hydroxybenzyl)-2,4,6-trimethylbenzene (Irganox®1330), ethylene bis[3,3-bis(3-tert-butyl-4-hydroxyphenyl)butyrate] (Hostanox®03) or 1,3,5-tris(3,5-di-tert-butyl-4-hydroxybenzyl)-isocyanurate (Irganox®3114).

polyethylene (HD-PE), medium density polyethylene (MD-PE), low density polyethylene (LD-PE), linear low density polyethylene (LLD-PE), metallocene polyethylene, cross-linked polyethylene (PE-X), recycled polyethylene, bi-modal polyethylene and mixtures of polyethylenes.

A particularly preferred polyethylene pipe comprises the components (A), (B), (C) and (D), wherein component (A) is

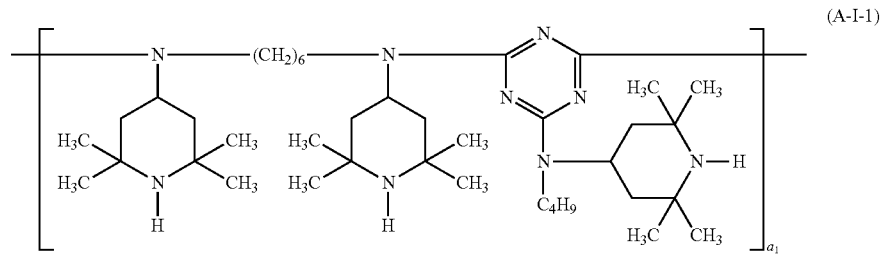

(A-I-1)

The weight ratio of component A) to component C) is preferably 1:10 to 10:1, in particular 1:5 to 5:1.

The polyethylene pipe may further comprise a component D) which is at least one compound selected from the group consisting of phosphites, phosphonites, hydroxylamines, tocopherols and tocopherol acetates. A phosphite, for example tris(2,4-di-tertbutylphenyl) phosphite, [3,3',5,5'-tetra-tert.butyl-1,1'biphenyl-2,2'-diyl]-[3-(3-methyl-4-hydroxy-5-tert.butyl-phenyl)-propyl]-phosphite, [2,2'-ethylene-bis-(4,6-di-tert.butyl-phenyl)-1,1'-diyl]-[1,6-d imethyl-4-(5,7-di-tert.butyl)-3H-1-benzofuran-2-one)-phenyl]-phosphite, [2,2'-ethylene-bis-(4,6-di-tert.butyl-phenyl)-1,1'-diyl]-[1-methyl-6-tert.butyl-4-(5,7-di-tert.butyl)-3H-1-benzofuran-2-one)-phenyl]-phosphite or 6-[3-(3-tert-butyl-4-hydroxy-5-methylphenyl)propoxy]-2,4,8,10-tetra-tert-butyldibenzo[d,f][1,3,2]dioxaphosphepin, is particularly preferred.

The weight ratio of component A) to component D) is preferably 1:10 to 10:1, in particular 1:5 to 5:1.

Of interest is a polyethylene pipe which comprises components A), B), C) and D). The compounds of components A), B), C) and D) are known and are in essential commercially available.

Component A) is preferably present in the polyethylene in an amount of 0.01% to 2% by weight relative to the weight of the polyethylene.

Component B) is preferably present in the polyethylene in an amount of 0.01% to 5% by weight relative to the weight of the polyethylene.

Component C) is preferably present in the polyethylene in an amount of 0.1% to 5% by weight relative to the weight of the polyethylene.

Component D) is preferably present in the polyethylene in an amount of 0.1% to 5% by weight relative to the weight of the polyethylene.

According to a preferred embodiment the polyethylene pipe may additionally comprise a pigment, preferably a blue pigment.

The polyethylene of the pipe is preferably selected from HD-PE, MD-PE, LD-PE, LLD-PE, metallocene PE, PE-X, mixture of PE, recycled PE, bi-modal PE, PE-RT, PE 32, PE 40, PE 63, PE 80, PE 100, PE 112, PE 125, PE 100 RC, PE 100 RT and PE 100 RD, in particular from high density with $a_1$ being 2 to 10,
component (B) is a natural or synthetic hydrotalcite,
component (C) is 1,3,5-tris(3,5-di-tert-butyl-4-hydroxybenzyl)-2,4,6-trimethylbenzene, and
component (D) is tris[2,4-di-tert-butylphenyl]phosphite.

The polyethylene of the pipe according to the present invention may further comprise one or more conventional additives such as:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methylpentadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-d i-tert-butylhydroquinone, 2,5-d i-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α- methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-d i-tert-butylphenol), 2,2'-ethylidenebis(6-tert-butyl-4-isobutylphenol), 2,2'-methylenebis[6-(α-methylbenzyl)-4-nonyl phenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methyl phenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopenta-diene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis (3,5-ditert-butyl-4-hydroxybenzyl)malonate, bis[4-(1,1,3,3-tetramethylbutyl)phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-d i-tert-butyl-4-hyd roxybenzyl-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzypisocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzypisocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, di-octadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of 8-(3,5-di-tert-butyl-4-hydroxyphenyl) propionic acid e.g. N,N$^1$-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard XL-1, supplied by Uniroyal).

1.18. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenyl-amine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-di methyl butyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethyl hexyloxy)carbonylethyl]-2'-hyd roxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethlene glycol 300; [R—CH$_2$CHCOO—CH$_2$CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-(β-carbomethoxy-(3-cyanoyinyl)-2-methylindoline, neopentyl tetra(α-cyano-β,β-diphenylacrylate.

2.5. Sterically hindered amines, for example 1,6-Hexanediamine N, N'-bis(1-propyloxy-2,2,6,6-tetramethyl-4-piperidinyl)-N, N'-bis-2-[4,5-bis-(N-n-butyl-N'-propyloxy-2,2,6,6-tetramethyl-4-piperidinyl)-1,3,5-triazine], 1,6-Hexanediamine N,N'-bis(2,2,6,6-tetramethyl-4-piperidinyl)-N, N'-bis-2-[4,5-bis-(N-n-butyl-N'-2,2,6,6-tetramethyl-4-piperidinyl)-1,3,5-triazine], carbonic acid bis(1-undecyloxy-2,2,6,6-tetramethyl-4-piperidyl)ester, bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetram ethyl piperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetra methyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidypexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5- trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine, 3. Metal deactivators, for example N,N'-diphenyloxamide, N-salicylal-N'-salicyloylhydrazine, N,N'-bis(salicyloyl) hydrazine, N,N'-bis(3,5-di-tert-butyl-4-hydroxyphenylpropionyl)hydrazine, 3-salicyloylamino-1,2,4-triazole, bis (benzylidene)oxalyl dihydrazide, oxanilide, isophthaloyl dihydrazide, sebacoyl bi-sphenylhydrazide, N,N'-diacetyladipoyl dihydrazide, N,N'-bis(salicyloyl)oxalyl dihydrazide, N,N'-bis(salicyloyl)thiopropionyl dihydrazide.

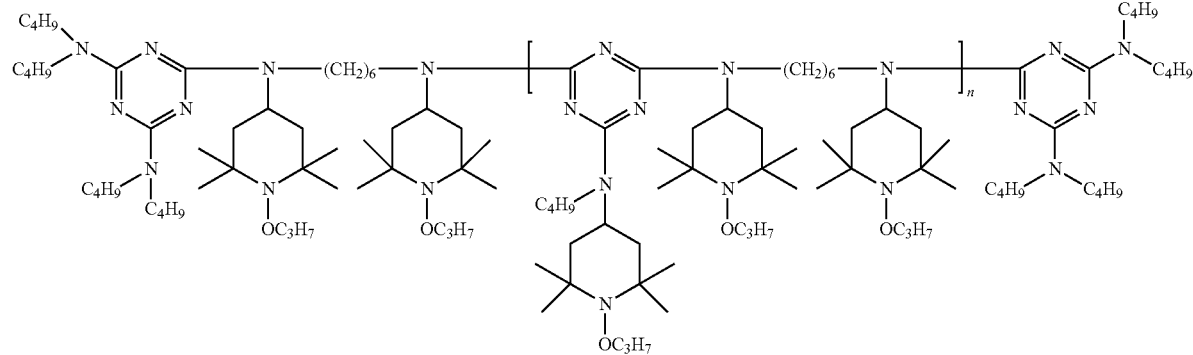

2.6 Benzoxazi none derivatives such as e.g. 2,2'-(1,4-phenylene)bis[4H-3,1-benzoxazin-4-one] (CAS No. 018600-59-4).

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 24-(2-hydroxy-4-[2-hydroxy-3-dodecyloxypropoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hyd roxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine, 2-(4,6-bis-biphenyl-4-yl-1,3,5-triazin-2-yl)-5-(2-ethyl-(n)-hexyloxy)phenol.

3a. Formamidines, for example Ethoxycarbonylphenyl)-N'-ethyl-N'-phenyl formamidine.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis (2,4-di-tert-butyl-6-methylphenyl)pentaerythritol diphosphite, bis(2,4,6-tris(tert-butylphenyl)pentaerythritol diphosphite, tristearyl sorbitol triphosphate, tetrakis(2,4-di-tert-butylphenyl) 4,4'-biphenylene diphosphonite, [3,3',5,5'-tetra-tert.butyl-1,1'biphenyl-2,2'-diyl]-[3-(3-methyl-4-hydroxy-5-tert.butyl-phenyl)-propyl]-phosphite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-ditert-butyl-6-methylphenyl)ethyl phosphite, tris-[4-tert.butyl-2-(5-tert.butyl-3H-1-benzofuran-2-one)-phenyl]-phosphite, tris-[4-(1,1'3,3'-tetramethyl-butane)-2-(5-(1,1'3,3'-tetramethyl-butane-3H-1-benzofuran-2-one)-phenyl]-phosphite, tris-[2,6-dimethyl-(5,7-di-tert.butyl)-3H-1-benzofuran-2-one)-phenyl]-phosphite, bis-[2,6-dimethyl-(5,7-di-tert.butyl)-3H-1-benzofuran-2-one)-phenyl]-phenyl-phosphite, bis-[2,6-dimethyl-(5,7-di-tert.butyl)-3H-1-benzofuran-2-one)-phenyl]-[2,4-di-tert-.butyl-phenyl]-phosphite, [3,3',5,5'-tetra-tert.butyl-1,1'biphenyl-2,2'-diyl]4-tert.butyl-(5-tert.butyl)-3H-1-benzofuran-2-one)-phenyl]-phosphite, [3,3',5,5'-tetra-tert.butyl-1,1'biphenyl-2,2'-diyl]-[2,6-dimethyl-(5,7-di-tert.butyl)-3H-1-benzofuran-2-one)-phenyl]-phosphite, [2,2'-methylene-bis-(4,6-di-tert.butyl-phenyl)-1,1'-diyl]-[1,6-dimethyl-4-(5,7-di-tert.butyl)-3H-1-benzofuran-2-one)-phenyl]-phosphite, [2,2'-ethylene-bis-(4,6-di-tert.butyl-phenyl)-1,1'-diyl]-[1,6-dimethyl-4-(5,7-di-tert.butyl)-3H-1-benzofuran-2-one)-phenyl]-phosphite, [2,2'-ethylene-bis-(4,6-di-tert.butyl-phenyl)-1,1'-diyl]-[1-methyl-6-tert.butyl-4-(5,7-di-tert.butyl)-3H-1-benzofuran-2-one)-phenyl]- phosphite, bis-(2,6-dimethyl-(5,7-di-tert.butyl)-3H-1-benzofuran-2-one)-phenol) pentaerythritol diphosphite, bis-(1-methyl-6-tert.butyl-(5,7-di-tert.butyl)-3H-1-benzofuran-2-one)-phenol) pentaerythritol diphosphite, bis-(4-tert.butyl-(5-tert.butyl)-3H-1-benzofuran-2-one)-phenol) pentaerythritol diphosphite, bis-(4-(1,1'3,3'-tetramethyl-butane)-(5-(1,1'3,3'-tetramethyl-butane))-3H-1-benzofuran-2-one)-phenol) pentaerythritol diphosphite, 6-fluoro-2,4,8,10-tetra-tert-butyl-12-methyl-dibenz[d,g]-1,3,2-dioxaphosphocin, 2,2',2''-nitrilo[triethyltris(3,31,5,51-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos® 168, Ciba Specialty Chemicals Inc.), tris(nonylphenyl) phosphite, phosphorus acid mixed 2,4-bis(1,1-dimethylpropyl) phenyl and 4-(1,1-dimethylpropyl)phenyl triesters (CAS Reg. No. 939402-02-5), phosphorous acid triphenyl ester polymer with alpha-hydro-omega-hydroxypoly[oxy (methyl-1,2-ethanediyl) $C_{10}$-16 alkyl esters (CAS Reg. No. 1227937-46-3).

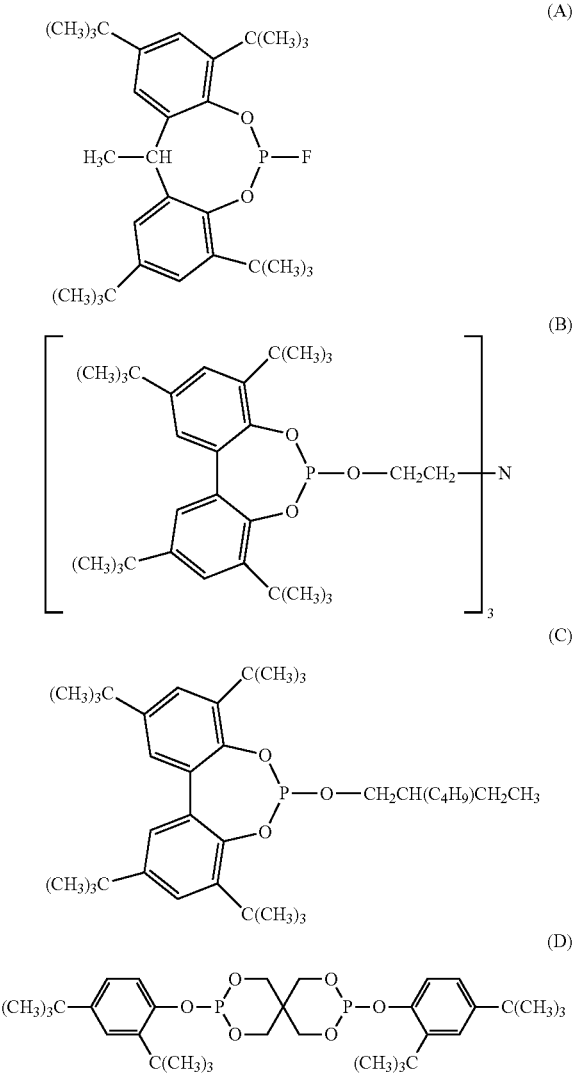

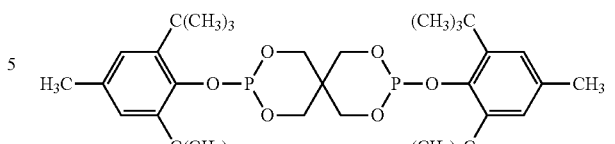

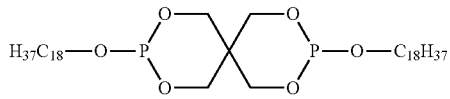

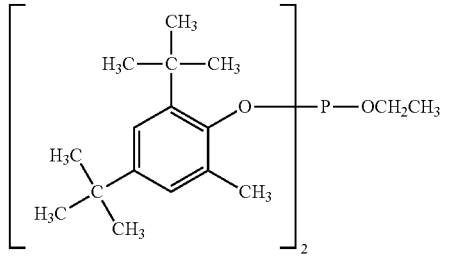

[2,2'-ethylene-bis-(4,6-di-tert.butyl-phenyl)-1,1'-diyl]-[1,6-dimethyl-4-(5,7-di-tert.butyl)-3H-1-benzofuran-2-one)-phenyl]-phosphite, [2,2'-ethylene-bis-(4,6-di-tert.butyl-phenyl)-1,1'-diyl]-[1-methyl-6-tert.butyl-4-(5,7-di-tert.butyl)-3H-1-benzofuran-2-one)-phenyl]-phosphite, [3,3',5,5'-tetra-tert.butyl-1,1'biphenyl-2,2'-diyl]-[3-(3-methyl-4-hydroxy-5-tert.butyl-phenyl)-propyl]-phosphite.

5. Hydroxylamines, for example N,N-dibenzylhydroxylamine, N,N-diethylhydroxylamine, N,N-dioctylhydroxylamine, N,N-dilaurylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Amine oxides, for example N,N-dibenzylhydroxylamine oxide, N,N-diethylhydroxylamine oxide, N,N-dioctylhydroxylamine oxide, N,N-dilaurylhydroxylamine oxide, N,N-ditetradecylhydroxylamine oxide, N,N-dihexadecylhydroxylamine oxide, N,N-dioctadecylhydroxylamine oxide, N-hexadecyl-N-octadecylhydroxylamine oxide, N-heptadecyl-N-octadecylhydroxylamine oxide, N,N-dialkylhydroxylamine oxide derived from hydrogenated tallow amine.

7. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

8. Thiosynergists, for example dilauryl thiodipropionate, dimistryl thiodipropionate, distearyl thiodipropionate, pentaerythritol tetrakis[3-(dodecylthio)propionate] or distearyl disulfide.

9. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis((3-dodecylmercapto)propionate.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate, zeolithes, hydrotalcites, hydrocalumites.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol. Beta-nucleating agents are also of interest.

12. Fillers and reinforcing agents, for example calcium carbonate, silicates, glass fibres, carbon fibers, glass beads, asbestos, talcum (preferably with a particle size of 0.01 to 20 μm), kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, anti-static agents and blowing agents.

14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctylbenzofuran-2-one.

The conventional additive may be present in the polyethylene of the pipe according to the present invention in an amount of e.g. 0.001 to 10%, relative to the weight of the polyethylene.

A further embodiment of the present invention is the polyethylene pipe as defined above, which is in contact with chlorinated (common chlorinated water disinfectants such as chlorine (hypo-chlorite), chlorine dioxide and chloramines) or non-chlorinated water.

Another embodiment of the present invention is the use of a mixture containing components A) and B) in a weight ratio of 1:10 to 10:1 for stabilizing a polyethylene pipe.

Still another embodiment of the present invention is a method for stabilizing a polyethylene pipe which comprises incorporating into the polyethylene components A) and B) in a weight ratio of 1:10 to 10:1.

The embodiments of the present invention include chlorinated or non-chlorinated water pipes for domestic, municipal or industrial applications, non-pressure up to high-pressure pipe applications used for drinkable or non-drinkable water, for general purpose water or waste water.

The examples below illustrate the invention in greater detail. All percentages and parts are by weight, unless stated otherwise.

Additives used on the following examples:
Irganox®1330:
  (CAS number: 1709-70-2)
  1,3,5-Tris(3,5-di-tert-butyl-4-hydroxybenzyl)-2,4,6-trimethylbenzene
Irgafos®168:
  (CAS number: 31570-04-4)
  Tris[2,4-di-tert-butylphenyl]phosphite
Sumilizer®GP:
  (CAS number: 203255-81-6)
  6-[3-(3-tert-Butyl-4-hydroxy-5-methylphenyl)propoxy]-2,4,8,10-tetra-tert-butyldibenzo[d,f][1,3,2]dioxaphosphepin
Compound D-1:
Compound (108) Disclosed in Example S-8 of WO-A-2015/121445
  [2,2'-Ethylene-bis-(4,6-di-tert.butyl-phenyl)-1,1'-diyl]-[1,6-dimethyl-4(5,7-di-tert.butyl)-3H-1-benzofuran-2-one)-phenyl]-phosphite
Chimassorb®2020:
  (CAS number: 192268-64-7)

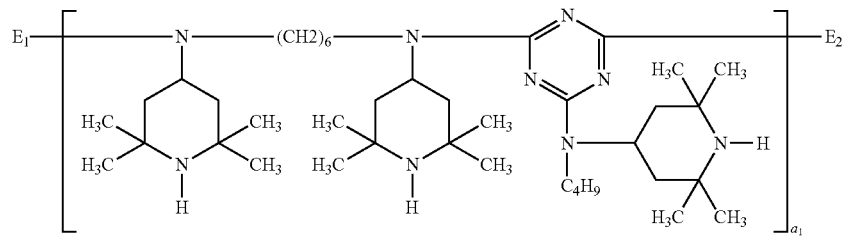

wherein $E_1$ is

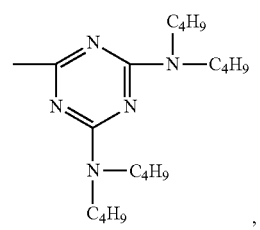

, $E_2$ is

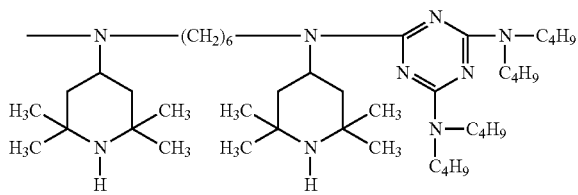

and $a_1$ is a number from 2 to 10.

Hycite®713:
(CAS number: 012304-65-3 or 11097-59-9)
Hydrotalcite (Magnesium aluminum hydroxide carbonate hydrate)

EXAMPLES

Preparation of the test specimens: A mixture of a non-stabilised high density polyethylene (HD-PE; Hostalen® CRP-100; natural classified under PE 100 of LyondellBasell; Melt Flow Rate: 190° C./5.0 Kg: 0.23 g/10 min (ISO 1133); Density: 0.95 g/cm3 (ISO 1183)) and the additives listed in Table 1 is mixed with a Mixaco Lab CM12 high speed mixer device.

The obtained full formulation is then compounded on a Collin 25X42D extruder at 240° C. and then injection molded on an Engel HL65 injection molding machine at 230° C.

The injection molded plaques 40 mm×60 mm×2 mm are exposed to chlorinated water under the following parameters: 40° C., pH 7, 2 mg/L NaClO and 50 L/hours. The parameters measured are OIT Values using a DSC Q2000 von TA Instrument (Waters) at 200° C. under $O_2$ after 0, 3 and 5 months exposition. The depletion results are listed in Table 2.

TABLE 1

| Additive Formulation | No. |
|---|---|
| 0.3% of Irganox ®1330 + 0.1% of Irgafos ®168 + 0.2% of Hycite ®713 | 0 |
| 0.3% of Irganox ®1330 + 0.1% of Irgafos ®168 plus 0.2% of Chimassorb ®2020 + 0.2% of Hycite ®713 | 1 |
| 0.3% of Irganox ®1330 + 0.1% of Sumilizer ®GP plus 0.2% of Chimassorb ®2020 + 0.2% of Hycite ®713 | 2 |
| 0.3% of Irganox ®1330 + 0.1% of Compound (D-1) plus 0.2% of Chimassorb ®2020 + 0.2% of Hycite ®713 | 3 |
| 0.3% of Irganox ®1330 + 0.1% of a mixture of Compound (D-1) and Irgafos ®168 in a weight ratio of 10/1 plus 0.2% of Chimassorb ®2020 + 0.2% of Hycite ®713 | 4 |

TABLE 2

| Formulation No. | OIT at time zero | OIT after 3 months | OIT after 5 months |
|---|---|---|---|
| 0 | 50 | 50 | 50 |
| 1 | 240 | 200 | 190 |
| 2 | 220 | 180 | 160 |
| 3 | 280 | 200 | 200 |
| 4 | 230 | 190 | 180 |

High OIT-values are desired.

The invention claimed is:

1. A polyethylene pipe, comprising:
0.01 to 2 wt. % of component A) is a hindered amine light stabilizer

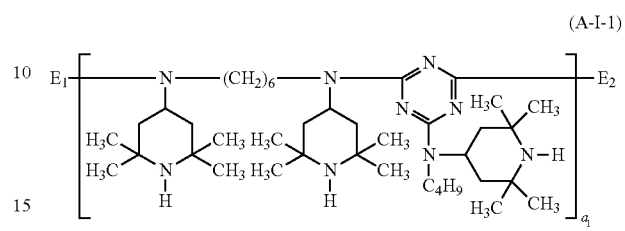

wherein $E_1$ is

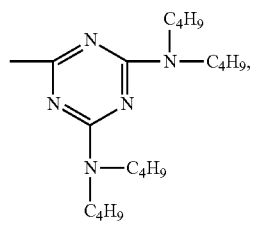

$E_2$ is

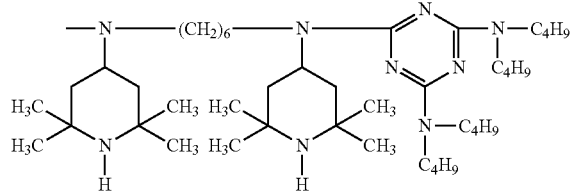

with $a_1$ being 2 to 10, relative to a weight of said polyethylene, 0.01 to 5 wt. % of component B) is a natural or synthetic hydrotalcite, relative to a weight of said polyethylene, component C) is at least one a phenolic oxidant which is 1,3,5-tris(3,5-di-tert-butyl-4-hydroxybenzyl)-2,4,6-trimethylbenzene, component D) is tris[2,4-di-tert-butylphenyl]phosphite, a weight ratio of component A) to component B) is 1:10 to 10:1, a weight ratio of component A) to component D) is 1:10 to 10:1 and a weight ratio of component A) to component C) of 1:5 to 5:1.

2. The polyethylene pipe according to claim 1, wherein component B) is at least one selected from the group consisting of magnesium aluminum hydroxide carbonate hydrate and zinc aluminum hydroxide carbonate hydrate.

3. The polyethylene pipe according to claim 1, further comprising a pigment.

4. The polyethylene pipe according to claim 1, wherein the polyethylene is selected from the group consisting of high density polyethylene (HD-PE), medium density polyethylene (MD-PE), low density polyethylene (LD-PE), linear low density polyethylene (LLD-PE), metallocene polyethylene, crosslinked polyethylene (PE-X), recycled polyethylene, bi-modal polyethylene and mixtures of polyethylenes.

5. The polyethylene pipe according to claim 1, which is in contact with chlorinated or non-chlorinated water.

6. A method for stabilizing a polyethylene pipe, the method comprising incorporating 0.01 to 2 wt. % of polyethylene component A) relative to a weight of said polyethylene, 0.01 to 5 wt. % of B) relative to a weight of said polyethylene, C) and D) in a weight ratio of component A) to component B) of 1:10 to 10:1,
a weight ratio of component A) to component D) is 1:10 to 10:1 and
into a polyethylene and forming a pipe,
wherein
component A) is a hindered amine light stabilizer

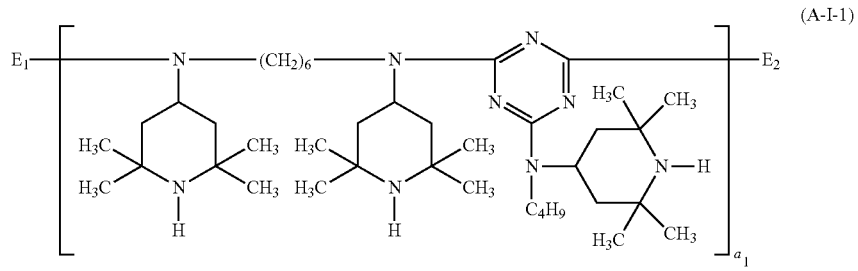

(A-I-1)

wherein $E_1$ is

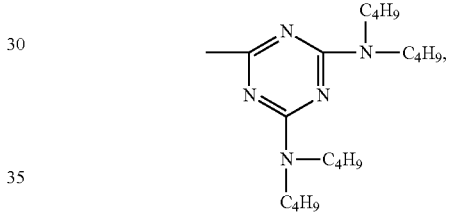

$E_2$ is

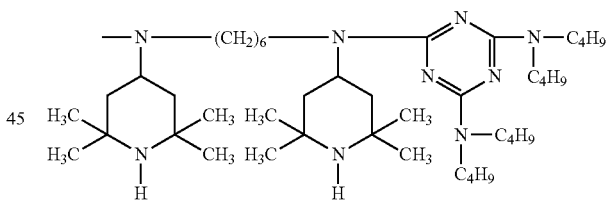

with $a_1$ being 2 to 10, and
component B) is a natural or synthetic hydrotalcite,
component C) is at least one phenolic oxidant which is 1,3,5-tris(3,5-di-tert-butyl-4-hydroxybenzyl)-2,4,6-trimethylbenzene,
component D) is tris[2,4-di-tert-butylphenyl]phosphite, and
a weight ratio of component A) to component C) of 1:5 to 5:1.

7. The polyethylene pipe according to claim 1, comprising:
0.1 to 5% by weight of Component (C) % by weight relative to a weight of said polyethylene.

* * * * *